United States Patent
Ito et al.

[11] 3,848,862
[45] Nov. 19, 1974

[54] VEHICLE HYDROPNEUMATIC SUSPENSION SYSTEM

[75] Inventors: Naganori Ito; Hiroshi Aikawa, both of Tokyo, Japan

[73] Assignee: Nissan Motor Company, Limited, Kanagawa-ku, Yokohama City, Japan

[22] Filed: Mar. 26, 1973

[21] Appl. No.: 344,485

[30] Foreign Application Priority Data
Mar. 27, 1972 Japan.................. 47-29701

[52] U.S. Cl. .............................................. 267/64 R
[51] Int. Cl. ............................................... F16f 5/00
[58] Field of Search ......... 267/64 R, DIG. 1, DIG. 2

[56] References Cited
UNITED STATES PATENTS

| | | | |
|---|---|---|---|
| 3,458,181 | 7/1969 | Muller | 267/64 R |
| 3,516,683 | 6/1970 | Capgras | 267/64 R |
| 3,556,542 | 1/1971 | Capgras | 267/64 R |

*Primary Examiner*—James B. Marbert

[57] ABSTRACT

A hydropneumatic suspension system for a vehicle adapted to prevent a vehicle body from inclining due to irregularities in the surface of a rough road over which the vehicle travels. The hydropneumatic suspension system comprises first and second hydropneumatic suspension struts and an accumulator disposed between the first and second suspension struts. The accumulator has a gas chamber and two fluid chamber defining therebetween the gas chamber. One of the two fluid chambers communicates with a fluid chamber of the first suspension strut and the other of the two fluid chambers communicates with a fluid chamber of the second suspension strut. The accumulator functions to remove pressure difference between hydraulic fluids in the respective fluid chambers of the first and second suspension structs thereby eliminating unusual inclination of the vehicle body which is caused when the vehicle travels over a rough road. The first and second suspension struts cooperates with right and left wheels or front and rear wheels of the vehicle thereby preventing a rolling or pitching of the vehicle.

20 Claims, 4 Drawing Figures

PATENTED NOV 19 1974

VEHICLE HYDROPNEUMATIC SUSPENSION SYSTEM

The present invention relates to a hydropneumatic suspension system for a vehicle and, more particularly, to a hydropneumatic suspension system for a wheeled vehicle including a hydropneumatic suspension strut which is adapted to be mounted between a wheel supporting means such as an axle and a vehicle body and whose effective length is automatically controlled to a substantially constant value irrespective of the weight and loading of the vehicle in which value the height of the vehicle body is maintained substantially constant independently of the weight and load of the vehicle.

As is well known in the art, a conventional suspension strut is usually equipped with a vehicle levelling valve or level regulating device which includes valve means selectively connecting a hydraulic fluid chamber defined in the cylinder of the strut with a source of fluid under pressure connecting the fluid chamber with a discharge line to control the volume of fluid contained in the fluid chamber thereby controlling the effective length of the suspension strut to a substantially constant value when weight and loading of the vehicle is varied. However, the vehicle level regulating device is prevented from controlling the effective length of the suspension strut to a substantially constant value when the weight and loading of the vehicle are constant and the vehicle travels over a rough road which causes relative movement between sprung and unsprung parts of the vehicle. Consequently, the vehicle rolls and pitches and in this manner the vehicle body is subjected to undesirable inclinations. Such undesirable inclinations of the vehicle body deteriorate the riding quality.

It is, therefore, an object of the invention to provide an improved hydropneumatic suspension system for a vehicle to eliminate the above-mentioned shortcomings encountered in the prior art system.

Another object of the invention is to provide an improved hydropneumatic suspension system for a vehicle to prevent undesirable inclinations of the vehicle body when the vehicle travels over a rough road.

These and other objects and advantages of the invention will become more readily apparent from the following description when taken in connection with the accompanying drawings in which.

Figure 1:
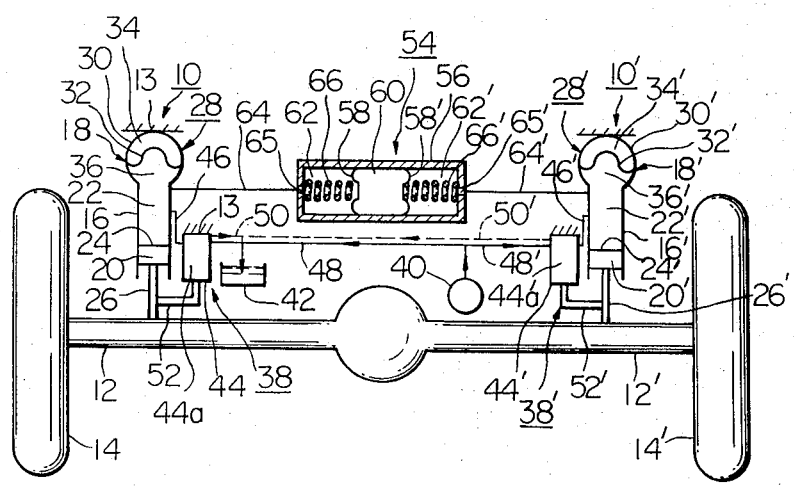
FIG. 1 is a schematic cross-sectional view of a preferred embodiment of a hydropneumatic suspension system according to the invention.

Referring now to FIG. 1, there is shown a preferred embodiment of the hydropneumatic suspension system implementing the present invention. The hydropneumatic suspension system comprises first and second hydropneumatic suspension struts 10 and 10' which are mounted between wheel supporting means 12 and 12' and a vehicle body 13 for maintaining the height of the vehicle body substantially constant independently of the weight and loading of the vehicle. In FIG. 1, the suspension struts 10 and 10' are shown as cooperating with right and left wheels 14 and 14' of the vehicle, respectively. The suspension strut 10 is substantially the same in construction as the suspension strut 10'. Thus, the members and elements of the suspension strut 10' bear the same reference numerals as the corresponding members and elements of the suspension strut 10, although prime notations are added thereto. In the interests of brevity, only the suspension strut 10 of the two substantially same suspension struts 10 and 10' will be described. The suspension strut 10 has a cylinder 16 positioned stationally relative to the vehicle body 13 and having an end closure 18. A piston 20 is slidably mounted in the cylinder 16 and defines a fluid chamber 22 between the cylinder 16 and the end closure 18. The fluid chamber 22 is filled with hydraulic fluid under pressure. The piston 20 is subjected on its upper end surface 24 to hydraulic fluid pressure. The piston 20 has a piston rod 26 connected with the piston 20 and extending outwardly of the cylinder 16. The piston rod 26 is connected to the wheel supporting means 12 such as an axle in a suitable manner. The effective length of the suspension strut 10 is maintained at a substantially constant value irrespective of the weight and loading of the vehicle by regulating the volume of hydraulic fluid in the fluid chamber 22 to maintain the vehicle body at a substantially constant level independently of the weight and loading of the vehicle.

A hydropneumatic spring means 28 is mounted on the cylinder 16 and is operably connected to the fluid chamber 22 of the suspension strut 10. The hydropneumatic spring means 28 has a casing 30 which is divided by a flexible partition member 32 such as a diaphragm into a gas chamber 34 filled with gas under pressure and a fluid chamber 36 filled with hydraulic fluid under pressure. The fluid chamber 36 communicates with the fluid chamber 22 defined in the cylinder 16. A part of the casing 30 and the diaphragm 32 constitute the end closure 18 of the cylinder 16. The hydropneumatic spring means 28 serves to dampen or absorb and desorb changes in the pressure or volume levels of the hydraulic fluid in the fluid chamber 22 due to momentary relative movements between the cylinder 16 and the piston 20 caused by inequalities of the road surface over which the vehicle travels thereby dampening relative movements of the sprung and the unsprung parts of the vehicle.

Normally, the effective length of the suspension strut 10 is maintained at a substantially constant value irrespective of the weight and loading of the vehicle. The suspension strut 10 assumes the neutral position shown in FIG. 1 in which the vehicle body is maintained at a predetermined level and in which the pressure of the hydraulic fluid in the fluid chamber 22 of the suspension strut 10 and the fluid chamber 36 of the hydropneumatic spring means 28 and the pressure of the gas in the gas chamber 34 of the hydropneumatic spring means 28 are sufficient to support the weight and loading of the vehicle.

First and second levelling valves or level regulating devices 38 and 38' are provided exteriorly of the hydropneumatic suspension struts 10 and 10', respectively, for controlling communication between each of the respective fluid chambers 22 and 22' of the suspension struts 10 and 10' and a hydraulic fluid pressure source 40 such as a pump, or a reservoir 42 to control the volume of fluid in the fluid chambers 22 and 22' as well as 36 and 36'. The level regulating device 38 is substantially the same as the level regulating device 38'. The members and elements of the level regulating device 38', accordingly, bear the same reference numerals as the corresponding members and elements of the level regulating device 38, although prime notations are added thereto. In the interests of brevity, only the level regulating device 38 of the two substantially same level regulating devices 38 and 38' will be described. The level regulating device 38 has a cylinder 44 positioned stationarily relative to the vehicle body 13. The cylinder 44 forms a chamber 44a which communicates with the fluid chamber 22 of the suspension strut 10 through a passage or conduit 46. The cylinder chamber 44a also communicates with the pump 40 through a conduit 48 and with the reservoir or sump 42 through a conduit 50. The pump 40 may be driven by the engine of the vehicle or any other convenient means such as an electric motor. The pump 40 draws hydraulic fluid from the reservoir 42 through a conduit (not shown) and pumps it into the fluid chamber 22 of the suspension strut 10 through the conduit 48, the level regulating device 38 and the conduit 46. Excessive hydraulic fluid from the fluid chamber 22 of the suspension strut 10 is returned to the reservoir 42 through the conduit 46, the level regulating device 38 and the conduit 50. The level regulating device 38 is provided with an arm 52 connected with the piston rod 26 of the piston 20 disposed in the suspension strut 10. The arm 52 is connected with a member (not shown) disposed in the cylinder chamber 44a for controlling valve means (not shown) such as a slide or spool valve or a stepped piston or alternatively for controlling a free piston (not shown) controlling a poppet valve which may be employed as the valve means. The valve means and the free piston are actuated in response to relative movement between the cylinder 44 and the arm 52. The level regulating device 38 when the weight and loading of the vehicle are constant and the vehicle travels over a rough road having inequalities in the road surface which cause momentary relative movements between the sprung and unsprung parts of the vehicle which are accompanied by relative axial movements between the cylinder 16 and the piston 20 of the strut 10 and between the cylinder 44 and the arm 52 of the device 38. However, when the weight or load of the vehicle increases the level regulating device 38 functions to establish communication between the fluid chamber 22 and the pump 40 and to obstruct communication between the fluid chamber 22 and the reservoir 42 to permit hydraulic fluid under pressure from the pump 40 to enter the fluid chamber 22 in response to relative movement between the cylinder 44 and the arm 52 thereby restoring the effective length of the suspension strut 10 to the previous, substantially constant value irrespective of the weight and loading of the vehicle. When the weight or load of the vehicle decrease, the level regulating device 38 further functions to obstruct communication between the fluid chamber 22 and the pump 40 and to establish communication between the fluid chamber 22 and the reservoir 42 to permit hydraulic fluid under pressure in the fluid chamber 22 to return to the reservoir 42 in response to relative movement between the cylinder 44 and the arm 52 thereby restoring the effective length of the suspension strut 10 to a previous, substantially constant value.

According to a principal feature of the invention, the hydropneumatic suspension system is constructed in such a manner that the hydropneumatic suspension strut 10 cooperates with the hydropneumatic suspension strut 10'. This is effected by an accumulator 54 which connects the suspension strut 10 with the suspension strut 10'. The accumulator 54 has a housing 56 divided by two yielding walls or flexible partition members such as diaphragms 58 and 58' into two fluid chambers 62 and 62' and a gas chamber 60 therebetween. The gas chamber 60 is defined between the two diaphragms 58 and 58' and is filled with gas under pressure. One of the two fluid chambers 62 and 62', first fluid chamber 62, is defined between the housing 56 and the diaphragm 58 and communicates with the fluid chamber 22 of the suspension strut 10 through a port 65 formed in the housing 56 and a conduit 64. The other of the two fluid chambers 62 and 62', second fluid chamber 62' is defined between the housing 56 and the diaphragm 58' and communicates with the fluid chamber 22' of the suspension strut 10' through a port 65' formed in the housing 56 and a conduit 64'. A spring 66 is provided in the fluid chamber 62 and biases the diaphragm 58 toward the gas chamber 60 against the force of the pressure of the gas in the gas chamber 60 to hold the diaphragm 58 in the neutral position shown in FIG. 1. A spring 66' is provided in the fluid chamber 62' and biases the diaphragm 58' toward the gas chamber 60 against the force of the pressure of the gas in the gas chamber 60 to hold the diaphragm 58' in the neutral position shown in FIG. 1. The gas chamber 60 is held by the actions of the springs 66 and 66' in the neutral position shown in FIG. 1 when the hydraulic fluid pressure in the fluid chamber 62 is equal to the pressure in the fluid chamber 62'. However, in case a pressure difference develops in between the fluid chambers 62 and 62' the gas chamber 60 is deformed to bias the corresponding diaphragm to increase the fluid pressure in the fluid chamber 62 or 62' in whichever the pressure is lower. The increased pressure is then applied to the corresponding fluid chamber 22 or 22' to bring about an equilibrium in the system.

The operation of the hydropneumatic suspension system is as follows:

When the weight and loading of the vehicle are varied, the cylinders 16 and 16' of the suspension struts 10 and 10' are moved alike upwardly or downwardly relative to the pistons 20 and 20' to alike reduce or increase the pressure of the hydraulic fluids in the fluid chambers 22 and 22' of the cylinders 16 and 16', respectively. At the same time the cylinders 44 and 44' of the level regulating devices 38 and 38' are alike moved upwardly or downwardly relative to the arms 52 and 52', respectively. The level regulating devices 38 and 38' are actuated to maintain the volumes of the hydraulic fluids in the fluid chambers 22 and 22' respectively thereby regulating the height of the vehicle body to a substantially constant value irrespective of the weight and load of the vehicle. In this instance, the pressures of the hydraulic fluids in the fluid chambers 22 and 22' are the same. The same fluid pressure in the fluid chambers 22 and 22' acts on the opposite sides of the gas chamber 60 of the accumulator 54, i.e., on the diaphragms 58 and 58', respectively, with the result that the gas chamber 60 is not operated and is held in the neutral position shown in FIG. 1.

When the weight and loading of the vehicle is constant and the right and left wheels 14 and 14' concurrently travel over alike inequalities in the road surface, the hydraulic fluids in the fluid chambers 22 and 22' of the suspension struts 10 and 10' are alike and concurrently compressed or relieved by or from the pistons 20 and 20', respectively to lift or lower the vehicle body by the same value on the right and left sides of the vehicle body. The level regulating devices 38 and 38' are kept inoperable by not responding to momentary relative movements of pistons and cylinders. In this instance, the pressures of the hydraulic fluids in the fluid chambers 22 and 22' of the suspension struts 10 and 10' are the same. Therefore, the gas chamber 60 of the accumulator 54 is held in the neutral position shown in FIG. 1, as stated above.

When the weight and loading of the vehicle is constant and only one of the right and left wheels 14 and 14', for example, the right wheel 14, travels over a projection or a depression formed in the road surface, only the pressure of the hydraulic fluid in the fluid chamber 22 of the suspension strut 10 cooperating with the wheel 14 is increased or reduced by the movement of the piston 20 to lift or lower the vehicle body on only the right side of the vehicle thereby causing the vehicle body to incline undesirably in a direction transverse of the vehicle. At this time, the pressure of the hydraulic fluid in the fluid chamber 22 is higher or lower than the pressure of the hydraulic fluid in the fluid chamber 22'. The pressure of the hydraulic fluid in the fluid chamber 22 or 22' in whichever the pressure is higher acts on the right or left side of the gas chamber 60 of the accumulator 54, i.e., the diaphragm 58 or 58' through the conduit 64 or 64' and the fluid chamber 62 or 62' and increases the pressure of the hydraulic fluid in the gas chamber 60 to bias same toward the fluid chamber 62' or 62 against the force of the spring 66' or 66. The gas chamber 60 biased by the pressure of the hydraulic fluid in the fluid chamber 62 or 62' increases the pressure of the hydraulic fluid in the fluid chamber 62' or 62 and accordingly the hydraulic fluid in the fluid chamber 22' or 22 communicating with the fluid chamber 62' or 62. The pressure of the hydraulic fluid in the fluid chamber 22' or 22 is, consequently, increased to lift the vehicle body also on the left or right side of the vehicle thereby eliminating the transverse inclination of the vehicle body. Thus, the vehicle is prevented from rolling.

Figure 2:
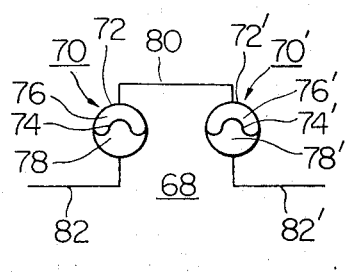
FIG. 2 is a cross-sectional schematic view of a modification of an accumulator forming a part of the hydropneumatic suspension system according to the invention.

In a modification of the accumulator described above with reference to FIG. 1, an accumulator unit 68 is constructed to comprise two separate accumulators 70 and 70' which are similar to the hydropneumatic spring means 28 and thus have a gas chamber and a fluid chamber each as shown in FIG. 2. The separate accumulators 70 and 70' have respectively casings 72 and 72' divided by flexible partition members 74 and 74' such as diaphragms into gas chambers 76 and 76' filled with gas under pressure and fluid chambers 78 and 78' filled with hydraulic fluid under pressure. The gas chambers 76 and 76' communicate with each other through a conduit 80. The fluid chambers 78 and 78' communicate with the fluid chambers 22 and 22' of the suspension struts 10 and 10' through conduits 82 and 82', respectively. The operation of the accumulator unit 68 shown in FIG. 2 is generally similar to that of the FIG. 1 accumulator 54. Thus, if the pressure in the fluid chamber 78 equals that in the fluid chamber 78', the gas chambers 76 and 76' are held in the neutral positions shown in FIG. 2. If a pressure difference develops between the fluid chambers 78 and 78', the pressure of the hydraulic fluid in the fluid chamber 78 or 78' in whichever the pressure is higher biases the corresponding diaphragm 74 or 74' to increase the pressure of the hydraulic fluid in the corresponding gas chamber 76 or 76'. The increased pressure is then transmitted through the line 80 to the gas chamber 76 or 76' to bias the diaphragm 74 or 74' to increase the pressure of the hydraulic fluid in the fluid chamber 78 or 78' in whichever the pressure is lower. The increased pressure is then applied to the corresponding fluid chamber 22 or 22' through the corresponding line 82 or 82' to bring about an equilibrium in the system.

Figure 3:
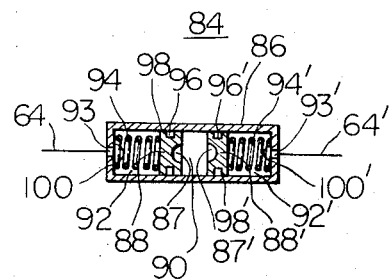
FIG. 3 is a view schematically showing in cross-section another modification of the accumulator.

In another modification of the FIG. 1 accumulator, two pistons are used instead of the two diaphragms, as shown in FIG. 3. In FIG. 3, an accumulator 84 has a housing 86 and two pistons 88 and 88' slidably disposed in a bore of the housing 86 and provided in the internal surfaces of the pistons with cavities 87 and 87', respectively. The pistons 88 and 88' define therebetween a gas chamber 90 filled with gas under pressure. The piston 88 defines a fluid chamber 92 between the piston 88 and the housing 86. The piston 88' devines a fluid chamber 92' between the piston 88' and the housing 86. The housing 86 is formed with two ports 93 and 93' through which the conduits 64 and 64' open into the fluid chambers 92 and 92', respectively. Springs 94 and 94' are disposed in the fluid chambers 92 and 92', respectively, and bias the pistons 88 and 88', respectively toward the gas chamber 90 to hold same in the neutral position shown in FIG. 3. The pistons 88 and 88' have packings 96 and 96' to provide sealing surfaces 98 and 98', respectively which cooperate with the corresponding parts of the housing 86 to constitute hermetic or fluid tight seats.

The operation of the accumulator 84 is similar to that of the accumulator 54, except that the pistons 88 and 88' can slide in the bore of the housing 86 with the result that the volume of the gas chamber 90 can be moved to the point where the pistons 88 and 88' completely compress the springs 94 and 94' against the corresponding internal end surfaces 100 and 100', respectively, of the housing 86 thereby enhancing the effect of increasing the pressure of the hydraulic fluid in either strut fluid chamber.

It will be understood that the operations of the two hydropneumatic suspension systems employing the modified accumulators 68 and 84, respectively, in lieu of the accumulator 54 are similar to that of the hydropneumatic suspension system employing the accumulator 54, except that the above-mentioned increased effect is obtained in the suspension system employing the accumulator 84.

It will be understood that each of the responsive gas chambers of the accumulators also serves as an auxiliary gas chamber which shares the function of the gas chamber of the hydropneumatic spring means and which damps more softly relative movements between the sprung and unsprung parts of the vehicle thereby softening the spring effect of each of the suspension struts. Consequently, if such an increase in the damping function is not desired in a hydropneumatic suspension system, the incorporation of an accumulator into the suspension system will lead to a reduction of the size of the gas chambers of hydropneumatic spring means.

Figure 4:
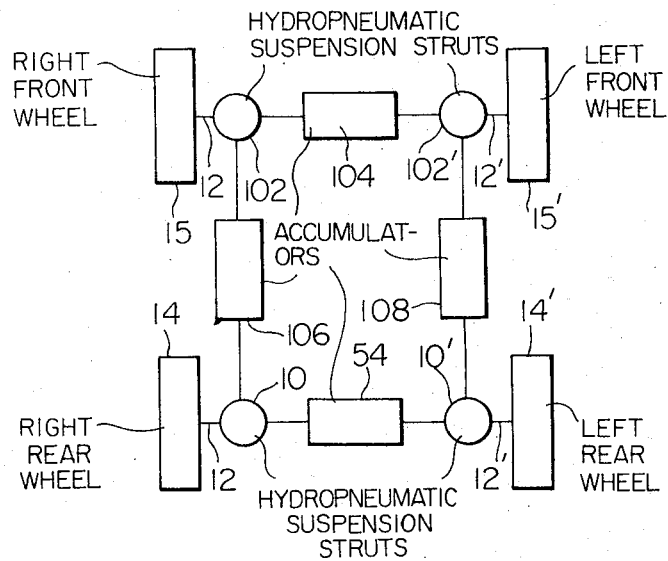
FIG. 4 is a block diagram schematically showing in plan view another preferred embodiment of a hydropneumatic suspension system according to the invention.

FIG. 4 shows another preferred embodiment of the hydropneumatic suspension system according to the invention. Like numerals refer to like parts throughout in FIGS. 1 and 4. In FIG. 4, the hydropneumatic suspension system is shown as comprising a combination of first and second hydropneumatic suspension struts 10 and 10' an accumulator 54, a second combination of third and fourth hydropneumatic suspension struts 102 and 102' and a second accumulator 104, a third combination of the first and third suspension struts 10 and 102 and a third accumulator 106 and a fourth combination of the second and fourth suspension struts 10' and 102' and a fourth accumulator 108. The third and fourth suspension struts 102 and 102' and the second, third and fourth accumulators 104, 106 and 108 are similar in construction to the first and second suspension struts 10 and 10' and the accumulator 54 illustrated in FIG. 1, respectively, and the detail description is therefore omitted. In this manner, the respective fluid chambers of the suspension struts 10, 10', 102 and 102' are connected in series with each other through the accumulators 54, 104, 106 and 108 and these suspension struts and accumulators constitute a closed loop. The third and fourth suspension struts 102 and 102' cooperate with the right and left wheels 15 and 15' of the vehicle.

The operation of the hydropneumatic suspension system is as follows:

When one of the wheels 14, 14', 15 and 15' encounters an irregularity in the surface of a rough road over which the vehicle travels, the vehicle body above the one wheel is raised or lowered to cause the vehicle body to incline longitudinally and transversely thereby increasing or decreasing pressure of hydraulic fluid in the fluid chamber of the suspension strut cooperating with the one wheel. It will be apparent from the description of the embodiment of FIG. 1 that pressures of hydraulic fluids in the respective fluid chambers of the suspension struts cooperating with the wheels excepting the one wheel are increased or decreased by the action of the accumulators 54, 104, 106 and 108 to raise or lower the vehicle body above the said wheels thereby avoiding undesirable inclination of the vehicle body. Thus, both pitching and rolling of the vehicle are prevented by utilizing the hydropneumatic suspension system shown in FIG. 4.

Although we have described a hydropneumatic suspension system in which the invention is applied to a pair of hydropneumatic suspension struts cooperating with a pair of right and left wheels of the vehicle, the invention can be applied to another pair of hydropneumatic suspension struts cooperating with another pair of right and left wheels of the vehicle.

Although we have described a hydropneumatic suspension system in which the invention is applied to hydropneumatic suspension struts cooperating with right and left wheels of the vehicle, the invention can be applied to pairs of hydropneumatic suspension struts cooperating with front and rear wheels of the vehicle thereby preventing the vehicle from pitching.

Although we have described a hydropneumatic suspension strut which is integral with a hydropneumatic spring means such as a hydropneumatic pressure reservoir and is equipped with a level regulating device located outside the strut, the invention can be applied to hydropneumatic suspension struts each of which is connected with a hydropneumatic spring means through a line and each of which is equipped with a level regulating device located inside the strut.

What is claimed is:

1. A hydropneumatic suspension system for a motor vehicle having a body and wheel supporting means, comprising first and second suspension struts each of which is mounted between said vehicle body and said wheel supporting means and has a chamber filled with pressurized hydraulic fluid, each of said suspension struts being retractable and extensible in response to relative movement between said vehicle body and said wheel supporting means to increase and reduce, respectively, the pressure of the hydraulic fluid in the corresponding chamber, a hydraulic fluid pressure source and a hydraulic fluid reservoir fluidly communicable with said chambers of said suspension struts to supply and discharge hydraulic fluid into and from, respectively, said chambers thereby maintaining the height of said vehicle body substantially constant independently of the load of said vehicle, levelling means disposed between said chambers and said source and between said chambers and said reservoir to control fluid communication therebetween and responsive to increases and reductions of the load of said vehicle to establish said fluid communication between said chambers and said source and between said chambers and said reservoir, an accumulator including a casing having therein first and second hydraulic fluid chambers, a gas chamber defined therebetween and filled with pressurized gas, and first and second partition members separating said first and second hydraulic fluid chambers, respectively, from said gas chamber, said first and second hydraulic fluid chambers of said accumulator communicating respectively with said chambers of said first and second suspension struts, each of said partition members being responsive to the difference between the fluid pressures in said hydraulic fluid chambers of said accumulator to move toward one of said hydraulic fluid chambers of said accumulator in which one the fluid pressure is lower.

2. A hydropneumatic suspension system as claimed in claim 1, in which said accumulator further includes two biasing means urging said partition members toward each other.

3. A hydropneumatic suspension system as claimed in claim 2, in which each of said partition members is a flexible diaphragm member deformably mounted in said casing.

4. A hydropneumatic suspension system as claimed in claim 2, in which said casing is a cylinder, and in which each of said partition members is a piston slidably mounted in said cylinder.

5. A hydropneumatic suspension system as claimed in claim 1, in which said gas chamber comprises first and second gas chambers spaced from and communicating with each other and said casing comprises first and second casings spaced from and connected with each other, said first and second casings having therein said first hydraulic fluid chamber, gas chamber and partition member and said second hydraulic fluid chamber, gas chamber and partition member, respectively, said first and second partition members separating said first and second hydraulic fluid chambers from said first and second gas chambers, respectively.

6. A hydropneumatic suspension system as claimed in claim 5, in which each of said partition members is a flexible diaphragm member deformably mounted in the corresponding casing.

7. A hydropneumatic suspension system as claimed in claim 1, in which each of said suspension struts includes a cylinder connected to one of said vehicle body and said wheel supporting means, a piston slidably mounted in said cylinder and defining said chamber of said suspension strut therein, and a piston rod connected to said piston and to the other of said vehicle body and said wheel supporting means.

8. A hydropneumatic suspension system as claimed in claim 1, further comprising first and second hydropneumatic spring means each of which includes a casing and a flexible partition member dividing the interior of said casing into a gas chamber filled with pressurized gas and a hydraulic fluid chamber filled with pressurized hydraulic fluid, said hydraulic fluid chambers of said hydropneumatic spring means communicating respectively with said chambers of said suspension struts.

9. A hydropneumatic suspension system as claimed in claim 1, in which said level regulating means comprises first and second level regulating devices disposed outside said chambers of said first and second suspension struts, respectively.

10. A hydropneumatic suspension system according to claim 1, in which said first and second suspension struts cooperate with right and left wheels of the vehicle.

11. A hydropneumatic suspension system according to claim 1, in which said first and second suspension struts cooperate with front and rear wheels of the vehicle.

12. A hydropneumatic suspension system for a motor vehicle having a body and wheel supporting means, comprising first, second and third suspension struts acting in two pairs of suspension struts cooperating respectively with right and left wheels and front and rear wheels of said vehicle, each of said suspension struts being mounted between said vehicle body and said wheel supporting means and having a chamber filled with pressurized hydraulic fluid, each of said suspension struts being retractable and extensivle in response to relative movement between said vehicle body and said wheel supporting means to increase and reduce, respectively, the pressure of the hydraulic fluid in the corresponding chamber, a hydraulic fluid pressure source and a hydraulic fluid reservoir fluidly communicable with said chambers of said suspension struts to supply and discharge hydraulic fluid into and from, respectively, said chambers thereby maintaining the height of said vehicle body substantially constant independently of the load of said vehicle, level regulating means disposed between said chambers and said source and between said chambers and said reservoir to control fluid communication therebetween and responsive to increases and reductions of the load of said vehicle to extablish said fluid communication between said chambers and said source and between said chambers and said reservoir, and first and second accumulators each of which includes a casing having therein first and second hydraulic fluid chambers, a gas chamber defined therebetween and filled with pressurized gas, and first and second partition members separating said first and second hydraulic fluid chambers, respectively, from said gas chamber, said first and second hydraulic fluid chambers of said first accumulator communicating respectively with said chambers of said first and second suspension struts, said first and second hydraulic fluid chambers of said second accumulator communicating respectively with said chambers of said second and third suspension struts, each of said partition members being responsive to the difference between the fluid pressures in said hydraulic fluid chambers of the corresponding accumulator to move toward one of said hydraulic fluid chambers of the corresponding accumulator in which one the fluid pressure is lower.

13. A hydropneumatic suspension system as claimed in claim 12, in which each of said accumulators further includes two biasing means urging said partition members of said accumulator toward each other.

14. A hydropneumatic suspension system as claimed in claim 13, in which each of said partition members is a flexible diaphragm member deformably mounted in said casing of the corresponding accumulator.

15. Hydropneumatic suspension system as claimed in claim 13, in which said casing of each of said accumulators is a cylinder, and in which each of said partition members is a piston slidably mounted in said cylinder of the corresponding accumulator.

16. A hydropneumatic suspension system as claimed in claim 12, in which said gas chamber of each of said accumulators comprises first and second gas chambers spaced from and communicating with each other and said casing of each of said accumulators comprises first and second casings spaced from and connected with each other, said first and second casings having therein said first hydraulic fluid chamber, gas chamber and partition member and said second hydraulic fluid chamber, gas chamber and partition member, respectively, of the corresponding accumulator, said first and second partition members separating said first and second hydraulic fluid chambers from said first and second gas chambers, respectively, of the corresponding accumulator.

17. A hydropneumatic suspension system as claimed in claim 16, in which each of said partition members is a flexible diaphragm member deformably mounted in the corresponding casing.

18. A hydropneumatic suspension system as claimed in claim 12, in which each of said suspension struts includes a cylinder connected to one of said vehicle body and said wheel supporting means, a piston slidably mounted in said cylinder and defining said chamber of said suspension strut therein, and a piston rod connected to said piston and to the other of said vehicle body and said wheel supporting means.

19. A hydropneumatic suspension system as claimed in claim 12, further comprising first, second and third hydropneumatic spring means each of which includes a casing and a flexible partition member dividing the interior of said casing into a gas chamber filled with pressurized gas and a hydraulic fluid chamber filled with pressurized hydraulic fluid, said hydraulic fluid chambers of said first, second and third spring means communicating respectively with said chambers of said first, second and third suspension struts.

20. A hydropneumatic suspension system as claimed in claim 12, in which said level regulating means comprises first, second and third level regulating devices disposed outside said chambers of said first, second and third suspension struts, respectively.

* * * * *